United States Patent
Kamikawa et al.

(10) Patent No.: US 7,171,155 B2
(45) Date of Patent: Jan. 30, 2007

(54) LEARNING SUPPORT METHOD AND LEARNING SUPPORT PROGRAM

(75) Inventors: Shunichi Kamikawa, Kawasaki (JP); Hiroshi Kuzumaki, Ota (JP); Keiko Chida, Ota (JP); Ryusuke Momose, Ota (JP)

(73) Assignee: Fujitsu Limited, Kawasaki (JP)

( * ) Notice: Subject to any disclaimer, the term of this patent is extended or adjusted under 35 U.S.C. 154(b) by 617 days.

(21) Appl. No.: 10/259,882

(22) Filed: Sep. 30, 2002

(65) Prior Publication Data
US 2003/0180702 A1    Sep. 25, 2003

(30) Foreign Application Priority Data
Mar. 20, 2002    (JP)    ............................. 2002-078172

(51) Int. Cl.
*G09B 3/00*    (2006.01)
(52) U.S. Cl. ....................... 434/350; 434/323
(58) Field of Classification Search ................. 434/350
See application file for complete search history.

(56) References Cited
U.S. PATENT DOCUMENTS

| | | | |
|---|---|---|---|
| 5,810,605 A * | 9/1998 | Siefert ........................ 434/362 |
| 6,004,135 A * | 12/1999 | Trattner et al. ............. 434/169 |
| 6,024,577 A * | 2/2000 | Wadahama et al. ......... 434/322 |
| 6,302,698 B1 * | 10/2001 | Ziv-El ........................ 434/323 |
| 6,438,353 B1 * | 8/2002 | Casey-Cholakis et al. .. 434/350 |
| 6,606,480 B1 * | 8/2003 | L'Allier et al. ............. 434/362 |
| 6,885,844 B2 * | 4/2005 | Roschelle et al. .......... 434/350 |
| 2004/0115596 A1 * | 6/2004 | Snyder et al. ............... 434/118 |

* cited by examiner

*Primary Examiner*—Robert P. Olszewski
*Assistant Examiner*—Cameron Saadat
(74) *Attorney, Agent, or Firm*—Staas & Halsey LLP

(57) ABSTRACT

A learner clicks "Understood" button when he or she could understand a learning material or clicks "Not Understood" button when he or she could not understand. When the "Not Understood" button is clicked, the learning server machine transmits an explanation choice information to display a Web page including a knowledge tree that shows a structure of the learning material. The Web page contains headings of explanations and choosing ratios as end-nodes of the knowledge tree. The explanation describes the learning material in detail. The choosing ratio is a ratio of each of the explanations chosen by learners who attended the same lecture using the same learning material.

9 Claims, 16 Drawing Sheets

3.2.2 Indirect Routing

Choose Explanation you want to display. Numerals in brackets are chosen ratios of explanations by learners who attended the same learning material unit.

1. Transport Layer (37%)
2. Data Link Layer (11%)
3. IP Address    (10%)

Not Understood

FIG.2

<LEARNING MATERIAL DB11>

| Learning Material Number | Learning Material Name | Chapter Number | Chapter Name | Section Number | Section Name | Item Number | Item Name | Learning Material Unit Number | Learning Material Entity |
|---|---|---|---|---|---|---|---|---|---|
| 2765 | Introduction To Network | 3 | Routing | 2 | Routing Methed | 2 | Indirect Routing | 2765-00-030202-00-02 | ........ |

FIG.4

<Knowledge Tree DB 12>

| Node Number | Node Name | Node Number of Next Hierarchy | Node Name of Next Hierarchy | Explanation Number |
|---|---|---|---|---|
| 3 | Routing | 3.1 | Concept of Routing | |
| 3 | Routing | 3.2 | Routing Methed | |
| ⋮ | ⋮ | ⋮ | ⋮ | ⋮ |
| 3.2 | Routing Methed | 3.2.1 | Direct Routing | |
| 3.2 | Routing Methed | 3.2.2 | Indirect Routing | |
| ⋮ | ⋮ | ⋮ | ⋮ | ⋮ |
| 3.2.1 | Direct Routing | 3.2.1.1 | ○○○○ | |
| ⋮ | ⋮ | ⋮ | ⋮ | ⋮ |
| 3.2.2 | Indirect Routing | 3.2.2.1 | Basic Concept of Indirect Routing | |
| 3.2.2 | Indirect Routing | 3.2.2.2 | Network Model | |
| ⋮ | ⋮ | ⋮ | ⋮ | ⋮ |
| 3.2.2.1 | Basic Concept of Indirect Routing | T1 | Function of Indirect Routing | 01-007615-03 |
| ⋮ | ⋮ | ⋮ | ⋮ | ⋮ |
| 3.2.2.2 | Network Model | 3.2.2.2.1 | OSI Seven-Layer Model | |
| ⋮ | ⋮ | ⋮ | ⋮ | ⋮ |
| 3.2.2.2.1 | OSI Seven-Layer Model | T4 | Physical Layer | 01-007618-03 |
| 3.2.2.2.1 | OSI Seven-Layer Model | T5 | Data Link Layer | 01-007619-03 |
| 3.2.2.2.1 | OSI Seven-Layer Model | T6 | Network Layer | 01-007620-03 |
| 3.2.2.2.1 | OSI Seven-Layer Model | T7 | Transport Layer | 01-007621-03 |
| ⋮ | ⋮ | ⋮ | ⋮ | ⋮ |

FIG.5

<Explanation DB 13>

| Explanation Number | Explanation Entity |
|---|---|
|  |  |
| 01-007621-03 | Transport Layer of OSI seven-layer model has a function to provide a communication path defined in a lower layer. It provides multiplexing of data unit, troubleshooting (detection/recovery) or the like. |
|  |  |

FIG.6

<LEARNER DB 14>

| Learner Number | Learner Name | Learning Material Number | Lecture Identifying number (Learner number-Learning material number-Suffix) |
|---|---|---|---|
|  |  |  |  |
| 01-007621-03 | Ii Learning | 2765 | 01-00367254-2765-00 |
|  |  |  |  |

FIG.7

<LEARNING MANAGEMENT DB 15>

| Lecture Identifying Number | Start Date | Deadline | End Date | Final Test Result | Learning Material Unit Number | Score |
|---|---|---|---|---|---|---|
| 01-00367254-2765-00 | 2001.12.01 | 2002.02.28 | | | 2765-00⋯⋯ -030202-00-02 | |

FIG.8

<LEARNING HISTORY DB 16>

| Lecture Identifying Number | Event Serial Number | Event | Date and Time of Event | Learning Material Unit Number | Status |
|---|---|---|---|---|---|
| 01-00367254-2765-00 | 000013 | "No Understood" button was clicked | 2001.12.05 13:43:08 | 2765-00-030202-00-02 | Keyword Selection Screen Image is currently displayed |
| 01-00367254-2765-00 | 000021 | "Understood" button was clicked | 2001.12.05 14:10:17 | 2765-00-030301-00-02 | Go On |

FIG.11

[Explanation]

Transport Layer of OSI seven-layer model has a function to provide a communication path defined in a lower layer. It provides multiplexing of data unit, troubleshooting (detection/recovery) or the like.

FIG.12

<Detailed History DB17>

| Lecture Identifying Number | Event Serial Number | Chosen Node | Date and Time of Choice |
|---|---|---|---|
|  |  |  |  |
| 01-00367254-2765-00 | 000013 | T7 | 2001.12.05 13:45:58 |
|  |  |  |  |

FIG.13

<Choosing Ration DB 18>

| Learning Material Unit Number | Total Number of Learners | Number of Not Understood Learners | Choosen Node Number | Chooser Number | Choosing Ratio |
|---|---|---|---|---|---|
| 2765-00-030202-00-02 | 357 | 73 | T7 | 27 | 37(%) |

FIG.15

3.2.2 Indirect Routing (Le

Choose Explanation you want to display. Numerals in brackets are chosen ratios of explanations by learners who attended the same learning material unit.

1. Transport Layer (37%)
2. Data Link Layer (11%)
3. IP Address (10%)

Not Understood

FIG.16

<Learning Material Evaluation DB19>

| Learning Material Number | Learning Material Evaluation Value | Total Number of Learners | Learning Material Unit Number | Weighting Value of Learning Material Unit | Number of Not Understood Learners | Number of Understood Learners | Evaluation Value of Learning Material Unit |
|---|---|---|---|---|---|---|---|
| 2765 | 91 | 357 | | | | | |
| | | | 2765-030202-00-02 | 0.2 | 7.3 | 12 | 8.76 |
| | | | | | | | |

Weighting Value of Not Understood Button α = 4
Weighting Value of Understood Button β = 1

LEARNING SUPPORT METHOD AND LEARNING SUPPORT PROGRAM

BACKGROUND OF THE INVENTION

1. Field of the Invention

The present invention relates to a learning support method and a learning support program in so-called "e-Learning" system.

2. Prior Art

In late years the learning support system with a network and the World Wide Web technology has been developed. A learner (a student) is able to attend a lecture opened on the Web through a Web browser. Accordingly, a learner can study in a desired time at a desired place without limitations of time and place.

However, unlike a classroom education, in which a plurality of learners gather on a classroom to attend a lecture, each learner has to study individually in the learning support system.

In the classroom education, an instructor can realize intelligibility and degree of concentrations of the learners through their facial expressions, behavior and an atmosphere of the classroom. Therefore, the instructor can improve the intelligibility by changing a way of explanation and so on.

On the other hand, a service offerer of a conventional learning support system grasps the intelligibility of the learners indirectly through test results and questions from the learners. However, a frequency of test is limited. Further it is difficult to know intelligibility of each learner based on contents of the questions because a question is a voluntary action of a learner.

Since the learner who could not understand the contents of the lecture does not usually realize what point he or she could not understand, he or she cannot construct a question by analyzing an unknown portion. For example, a questioner who asks "what is corresponding to the session layer?" after the description "IP of TCP/IP corresponds to a network layer of OSI seven-layer model and TCP corresponds to a transport layer thereof" understands the contents of the description. On the contrary, a learner who does not know the OSI seven-layer model cannot ask questions about the description.

Further, in a classroom education, a learner does not exit from a classroom without saying a word even if he or she could not understand the contents of the lecture because he or she is attending the lecture with other learners in the classroom. However, in e-learning, a learner stops attending a lecture when he or she could not understand the contents of the lecture with or without frustration because he or she is not restrained in a classroom.

SUMMARY OF THE INVENTION

It is therefore an object of the present invention to provide an improved learning support method, which is capable of supporting a learner to learn and not to stop attending a lecture when a learner cannot understand the contents of the lecture. For the above object, according to the present invention, there is provided a learning support method with an on-line computer that holds a plurality of learning materials explanations to describe the contents in detail and relevance information that gives indication to choose at least one of the explanations, the method includes a learning material transmitting step for transmitting one of the learning materials to a client machine, a response information receiving step for receiving response information of learners about the transmitted learning material from the client machine, an explanation choice transmitting step for transmitting explanation choice information including headings of the explanations corresponding to the transmitted learning material and the relevance information when the response information represents that the learner did not understand the learning material, a choice information receiving step for receiving information representing which explanation the learner chose based on the transmitted headings, and an explanation transmitting step for transmitting the chosen explanation to the client machine.

With this method, when a learner who studies with a learning material through a client machine transmits the information that he or she could not understand the contents of the learning material, the learner receives explanation choice information. Then the selection of the desirable explanations in the explanation choice information by the learner gives him or her the detail explanation about the contents that could not be understood.

The relevance information may contain choosing ratio of each of the explanations chosen by learners who attended the same learning material. Color attribute for displaying the explanation choice information as color information may be included.

Further, the explanation choice information may contain information to display a knowledge tree showing a structure of the learning material on the client machine. In such a case, the headings of the explanations and the relevance information are shown as parts of the knowledge tree.

Still further, the method may include a storing step for storing data transmitted from client machines at the choice information receiving step for each learning material, and a calculating step for calculating the choosing ratios of the respective explanations that are chosen by learners with respect to the predetermined learning material based on the data storing at the storing step. The choosing ratios calculated at the calculating step are used as the relevance information.

DESCRIPTION OF THE ACCOMPANYING DRAWINGS

FIG. 2 is a table showing data layout of a learning material DB;

FIG. 4 is a table showing data layout of a knowledge tree DB;

FIG. 5 is a table showing data layout of an explanation DB;

FIG. 6 is a table showing data layout of a learner DB;

FIG. 7 is a table showing data layout of a learning management DB;

FIG. 8 is a table showing data layout of a learning history DB;

FIG. 11 shows a Web page displaying an explanation;

FIG. 12 is a table showing data layout of a detail history DB;

FIG. 13 is a table showing data layout of a choosing ratio DB;

FIG. 15 is a Web page displaying a list of end-nodes that have high frequencies;

FIG. 16 is a table showing data layout of a learning material judgement DB; and

DESCRIPTION OF THE PREFERRED EMBODIMENTS

Figure 1:
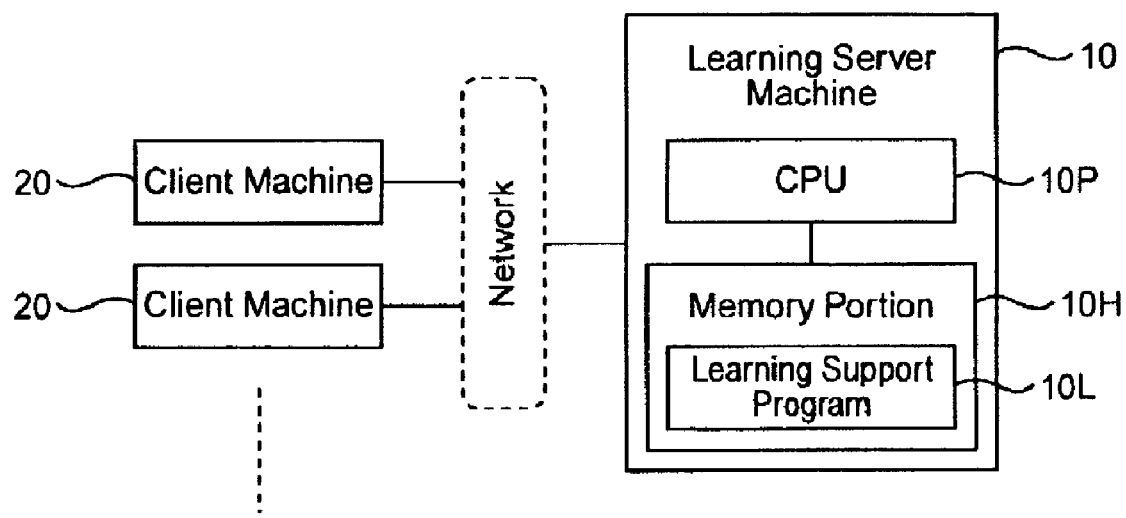
FIG. 1 is a block diagram showing the entire system of a learning support system of an embodiment according to the present invention.
Figure 17:
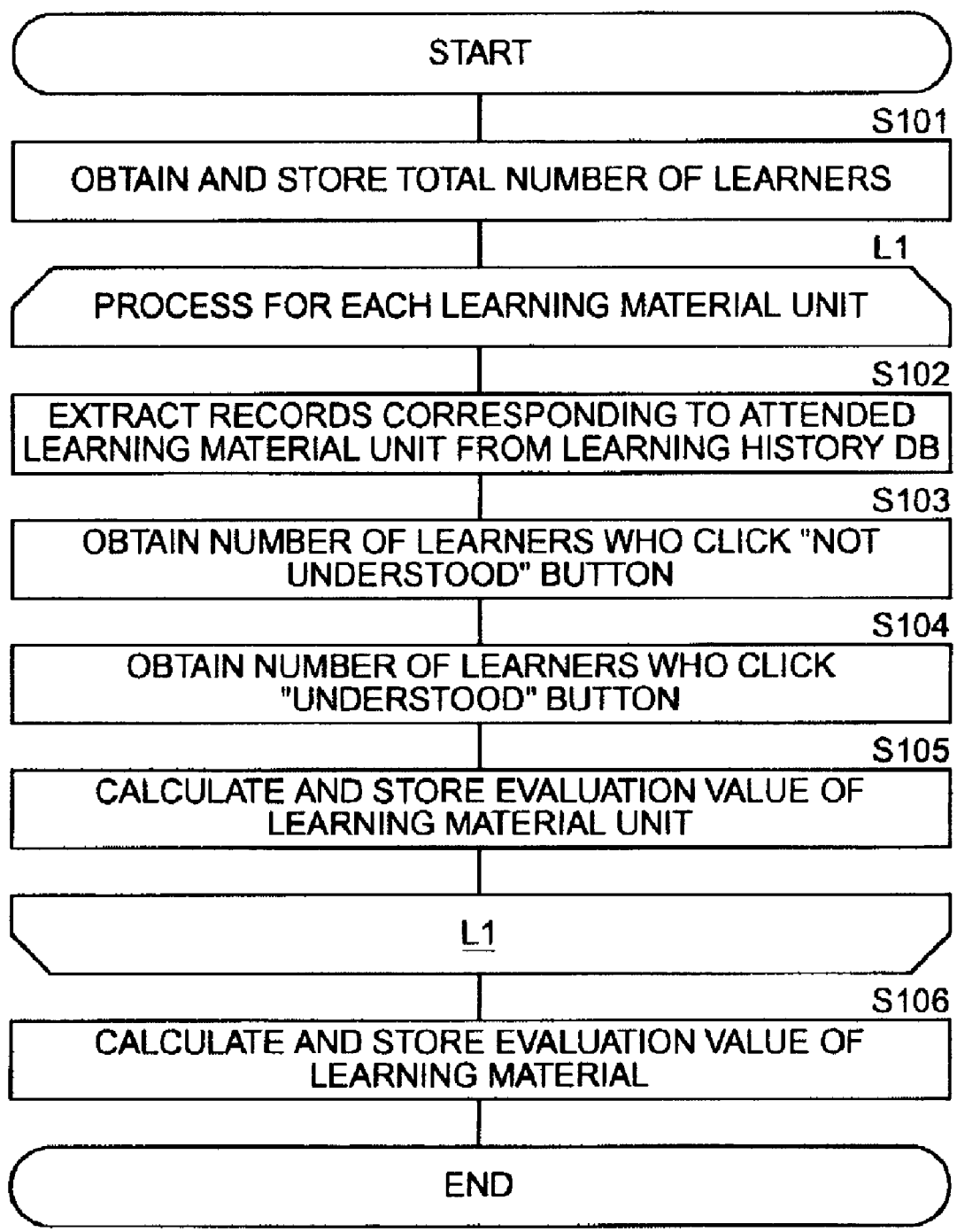
FIG. 17 is a flowchart showing a counting process for the judgement of the learning material.

An embodiment of the present invention will be described with reference to the drawings. FIG. 1 is a block diagram of the entire system including a learning server machine 10 of the embodiment. The learning server machine 10 is a server computer located in an e-learning center and it can connect to a plurality of client machines 20 through a network such as the Internet. Further the learning server machine 10 is provided with a CPU 10P and a memory portion 10H having a hard disk and a memory that are connected to the CPU 10P. A learning support program 10L is installed in the memory portion 10H. The learning support program 10L includes a Web server program module, a server side program module and other program modules to execute processes described below with reference to FIGS. 14 and 17.

For example, the client machine 20 consists of a personal computer in which a Web browser program is installed. A learner can attend a lecture supplied by the learning server machine 10 by accessing to the learning server machine 10 from a client machine 20. A leaning material supplied by the learning server machine 10 consists of a plurality of learning material units.

For example, when contents of a learning material are arranged in a hierarchical format of "chapter", "paragraph", "section" and "item", the learning material unit includes contents corresponding to the item. A learner who attends a lecture obtains a learning material corresponding to the lecture by the learning material unit in sequence to progress his or her learning. The learning materials are managed by the learning material DB 11 in the memory portion 10H of the learning server machine 10.

FIG. 2 shows a data layout of learning material DB 11. The learning material DB 11 contains a plurality of records that are created for respective learning material units, and each record includes fields of "Learning Material Number", "Learning Material Name", "Chapter Number", "Chapter Name", "Section Number", "Section Name", "Item Number", "Item Name", "Learning Material Unit Number" and "Learning Material Entity".

A learning material number, which is uniquely given for a learning material, is stored in the "Learning Material Number" field. A learning material name is stored in the "Learning Material Name" field. Number and name of a chapter in which the learning material unit corresponding to this record is contained are stored in the "Chapter Number" field and the "Chapter Name" field, respectively. Number and name of a section in which the learning material unit corresponding to this record is contained are stored in the "Section Number" field and the "Section Name" field, respectively. Number and name of an item corresponding to this record are stored in the "Item Number" field and the "Item Name" field, respectively. A learning material unit number, which is uniquely given for a learning material unit corresponding to this record, is stored in the "Learning Material Unit Number" field. The contents such as image data and text data of the learning material unit corresponding to this record are stored in the "Learning Material Entity" field.

Figure 3:
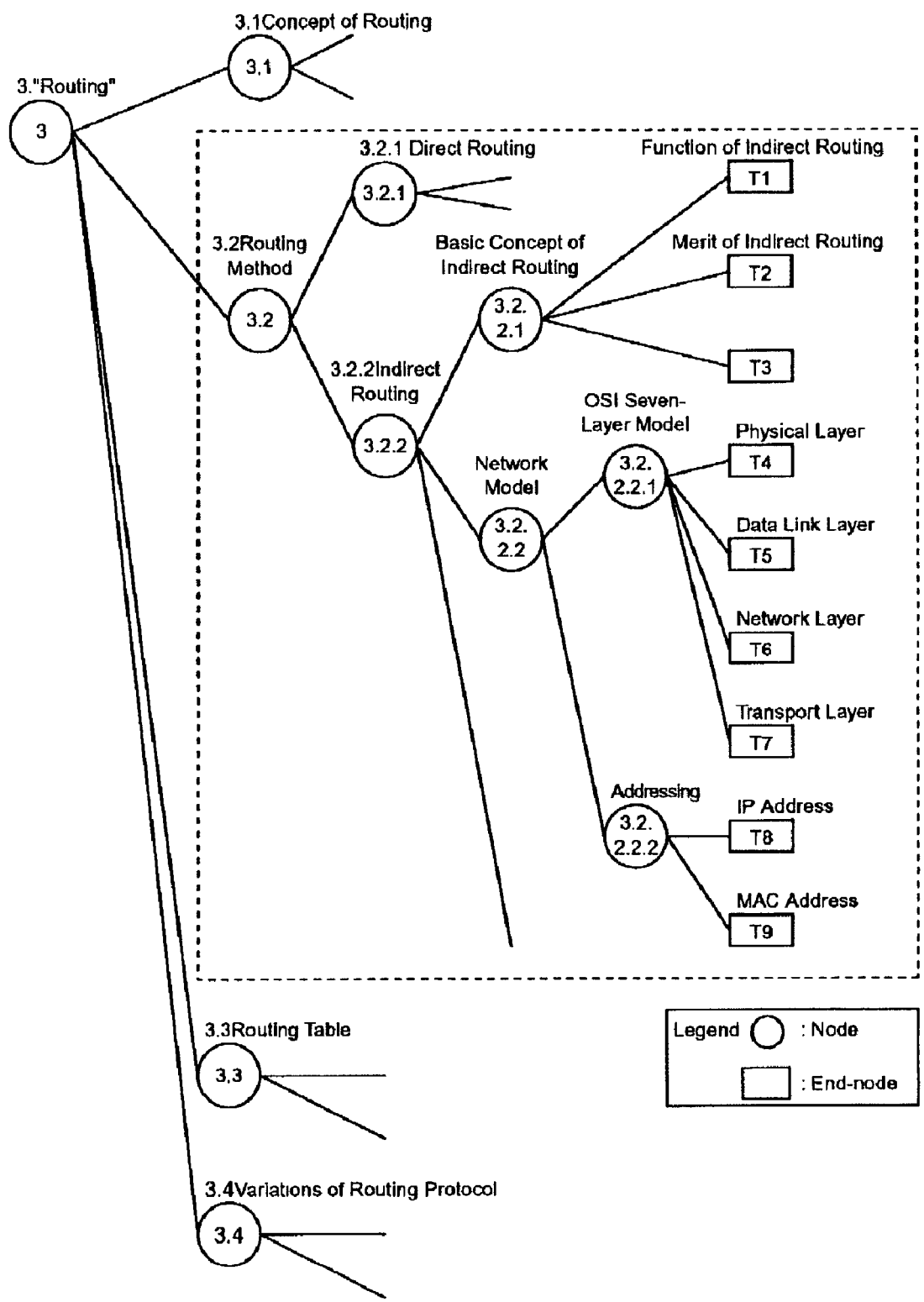
FIG. 3 is a chart showing a knowledge tree.

FIG. 3 is a chart of a knowledge tree showing a structure of the learning material. The learning material is described according to the hierarchical structure such as that consisting of layers of the chapter, section and item. FIG. 3 shows a structure from chapter 3 onward. Further, a knowledge tree DB 12 is installed in the memory portion 10H, and the learning server machine 10 can recognize the knowledge tree shown in FIG. 3 based on the knowledge tree DB 12.

The knowledge tree DB 12 contains a plurality of records, and each record includes fields of "Node Number", "Node Name", "Node Number of Next Hierarchy", "Node Name of Next Hierarchy" and "Explanation Number".

A node number, which is uniquely given for each node, is stored in the "Node Number" field. For instance, the chapter number, section number and item number are used as the node number. A name of node identified by the node number is stored in the "Node Name" field. A number of the lower node (the next hierarchical node) connected to the node identified by the node number is stored in the "Node Number of Next Hierarchy" field. A name of the lower node is stored in the "Node Name of Next Hierarchy" field. Only when the explanation is prepared for the node identified by the node number of next hierarchy, an explanation number is stored in the "Explanation Number" field. In the example of FIGS. 3 and 4, the explanations are prepared corresponding to all the nodes of the lowest hierarchy (end-nodes). Therefore, the explanation number is stored in the "Explanation Number" field of the records whose node number of next hierarchy indicates the end-node, and the "Explanation Number" field of the other records are filled by NULL. The "Node Name of Next Hierarchy" functions as a heading of the corresponding explanation.

Further, an explanation DB 13 shown in FIG. 5 is stored in the memory portion 10H. The explanation DB 13 contains a plurality of records that are created for the respective "Explanation Number", and each record includes fields of "Explanation Number" and "Explanation Entity". Data of explanations for matters and technical terms are stored in the "Explanation Entity" field.

Still further, a learner DB 14 shown in FIG. 6 is stored in the memory portion 10H. The learner DB 14 contains a plurality of records, and each record includes fields of "Learner Number", "Learner Name", "Learning Material Number" and "Lecture Identifying Number". A learner number that is uniquely given for a learner is stored in the "Learner Number" field. A learner name is stored in the "Learner Name" field. The number of the learning material of the learning course attended by the learner is stored in the "Learning Material Number" field. The lecture identifying number that is formed of the learner number, the learning material number and a suffix is stored in the "Lecture Identifying Number" field. The learner number and the learning material number are extracted from the lecture identifying number adversely. Namely, the learner and the learning material can be specified based on the lecture identifying number. Each record of the learner DB 14 uniquely corresponds to the lecture identifying number.

Yet further, a learning management DB 15 shown in FIG. 7 is stored in the memory portion 10H. The learning management DB 15 contains a plurality of records that are created for the respective lecture identifying numbers, and each record includes fields of "Lecture Identifying Number", "Start Date", "Deadline", "End Date", "Final Test Result", "Learning Material Unit Number" and "Score".

A date when the learner identified by the lecture identifying number started to attend the lecture with the learning material (learning course) of the corresponding learning material number is stored in the "Start Date" field. A deadline date set to the learning course is stored in the "Deadline" field. A default of the "End Date" is NULL. When the learner finishes the learning course, the finish date is stored in the "End Date" field. A default of the "Final Test Result" is NULL. When the learner takes a final test, a test result is stored in the "Final Test Result" field.

The learning material represented by the lecture identifying number consists of a plurality of learning material units as described above. One record of the learning management DB 15 contains a plurality of "Learning Materials Unit Number" fields and the "Score" fields corresponding to a plurality of learning material units. A unit number of the corresponding learning material unit is stored in the "Learning Material Unit Number" field. A test score is stored in the "Score" field when a test is set in the corresponding learning material unit.

Furthermore, a learning history DB 16 shown in FIG. 8 is stored in the memory portion 10H. The learning history DB 16 is a database to store a history of events detected during learning. Click of a button displayed on a Web page by a learner generates an event. When an event occurs while one learner is learning one learning material, the learning server machine 10 assigns a sequential event number to the event generated and creates a new record in the learning history DB 16 to store the content of the event with the sequential event number. The record is uniquely distinguished according to the lecture identifying number, which shows the learner number and the learning material number, and the sequential event number.

Figure 9:
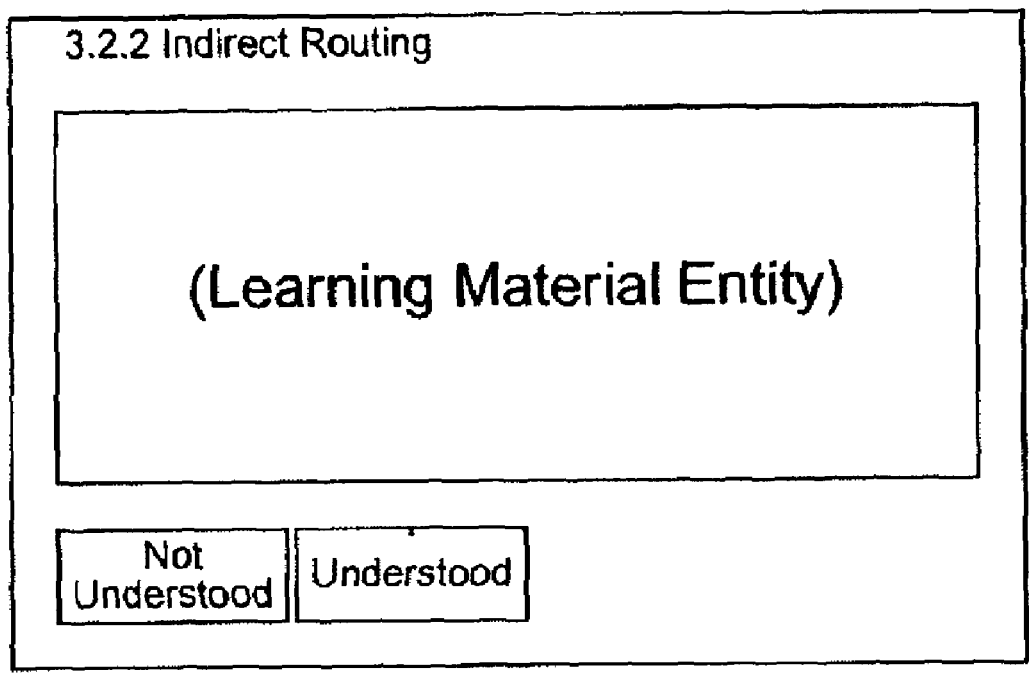
FIG. 9 shows a Web page displaying a learning material.

As shown in FIG. 9, a pair of buttons to search intelligibility of a learner are displayed on the learning Web page corresponding to one learning material unit. There are "Understood" and "Not Understood" buttons on the Web page.

A learner who understood the contents of the learning material unit clicks the "Understood" button on this Web page. When the "Understood" button is clicked, the learning server machine 10 finishes the process with respect to the present learning material unit and transfers the next learning material unit to the client machine 20 of the learner. On the other hand, a learner who could not understand the contents clicks the "Not Understood" button.

As described above, the history of clicks is accumulated in the learning history DB 16 as a record corresponding to a combination of the lecture identifying number and the sequential event number. As shown in FIG. 8, each record of the learning history DB 16 includes fields of "Event", "Date and Time of Event", "Learning Material Unit Number" and "Status" in addition to the fields of "Lecture Identifying Number" and "Sequential Event Number".

Information showing the contents of the event occurred is stored in the "Event" field. Date and time when the event occurred are stored in the "Date and Time of Event" field. The number of the learning material unit that was learned by the learner at the time of the occurrence of the event is stored in the "Learning Material Unit Number" field. A present condition of the process executed in connection with the event is stored in the "Status" field.

Figure 10:
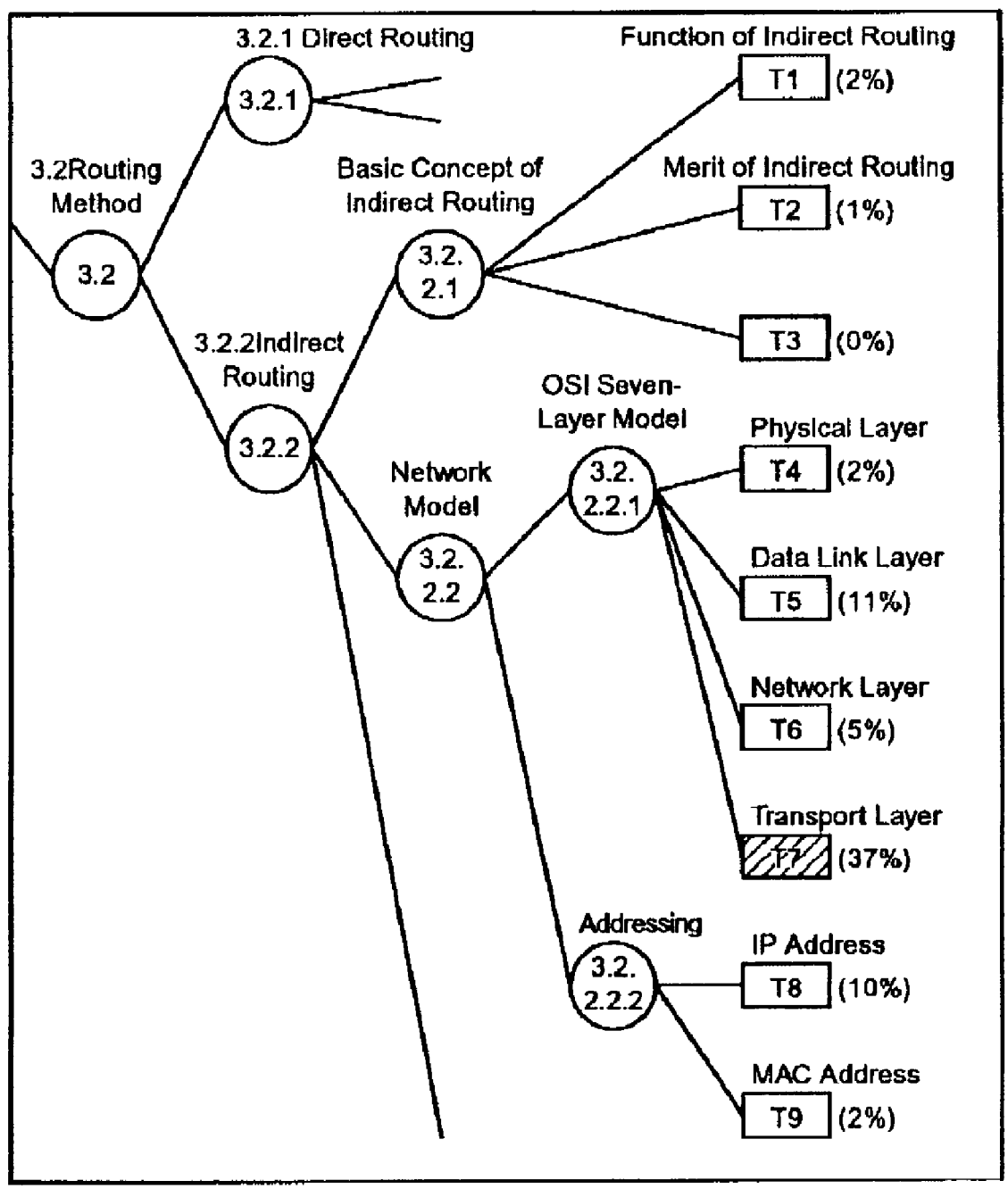
FIG. 10 shows a Web page displaying a knowledge tree.

When the "Not Understood" button shown in FIG. 9 is clicked, the learning server machine 10 transmits the data for displaying the knowledge tree screen (Web page) shown in FIG. 10 to the client machine 20 in addition to add a new record to the learning history DB 16. The knowledge tree screen includes a hierarchical set of nodes that are connected by lines. The end-nodes T1 through T9 form a list of choices that can be chosen by a learner.

In view of the screen, the learner can choose a desirable one of the end-nodes T1 through T9 to require the explanation corresponding to the chosen end-node. The learning server machine 10 transmits the chosen explanation to display an explanation Web page as shown in FIG. 11 on the client machine 20.

Further, a detailed history DB 17 shown in FIG. 12 is stored in the memory portion 10H. The detailed history DB 17 contains a plurality of records to register end-nodes chosen by learners. Particularly, each record of the detailed history DB 17 is identified by the combination of "Lecture Identifying Number" and "Event Serial Number" as with a record of the learning history DB 16 (FIG. 8). Each record includes fields of "Chosen Node" and "Date and Time of Choice". A number of an end-node chosen by a learner is stored in the "Chosen Node" field. Date and time when the learner chose the end-node are stored in the "Date and Time of Choice" field.

Still further, a choosing ratio DB 18 shown in FIG. 13 is stored in the memory portion 10H. Each record of the choosing ratio DB 18 uniquely corresponds to the learning material unit number. The learning server machine 10 analyzes the accumulated data and updates the choosing ratio DB 18 on the predetermined cycle (a period of the course, for example).

More specifically, each record of the choosing ratio DB 18 includes fields of "Total Number of Learners" and "Number of Not Understood Learners" in addition to the "Learning Material Unit Number". The total number of learners who attend the learning material that contains the current learning material unit during a predetermined period is stored in the "Total Number of Learners" field. The total number is counted based on the learning management DB 15. A number of learners who attend the current learning material unit and click "Not Understood" button during the predetermined period is stored in the "Number of Not Understood Learners" field. This number is counted based on the learning history DB 16.

Further, each record of the choosing ratio DB 18 includes a plurality of sets of the "Chosen Node Number" field, the "Chooser Number" field and the "Choosing Ratio" field corresponding to a plurality of the end-nodes (chosen nodes). The node number corresponding to the end-node in the knowledge tree in FIG. 3 is stored in the "Chosen Node Number" field. The number of learners who click the "Not Understood" button and chose the end-node in question is stored in the "Chooser Number" field. The chooser number is counted based on the learning history DB 16 and the detailed history DB 17. A percentage of the chooser number in the number of the learners who click the "Not Understood" button is stored in the "Choosing Ratio" field. That is, the choosing ratio is a ratio of each of the explanations chosen by learners who attended the same learning material.

Figure 14:
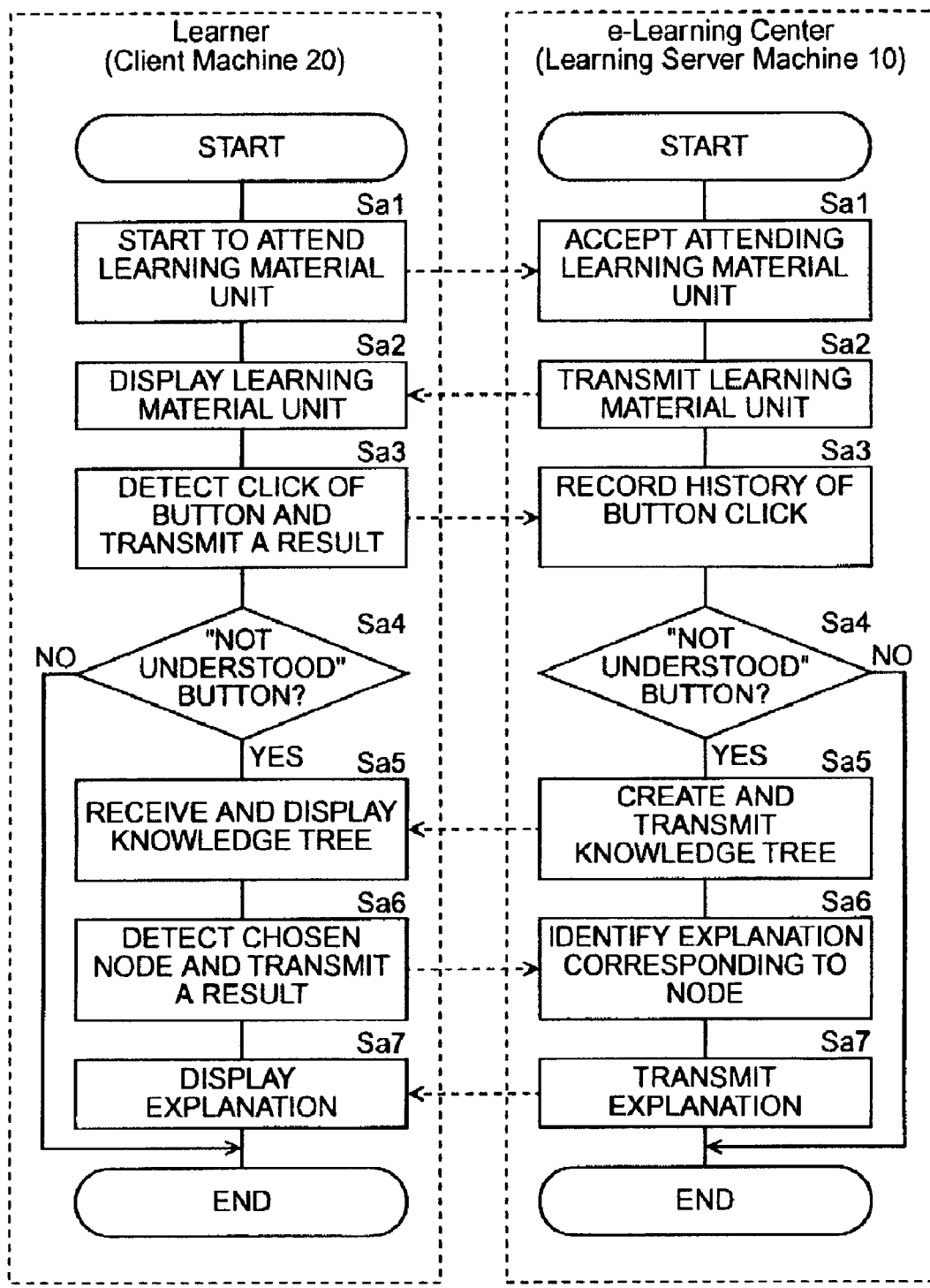
FIG. 14 is a flowchart showing a learning process of a learning material unit.

A process when a learner attend a learning material unit will be described with reference to FIG. 14.

At first, a learner operates the client machine 20 to notify the learning server machine 10 that he or she starts to attend one learning material unit (Sa1). Then the learning server machine 10 accepts attending the learning material unit (Sb1) and refers to the learning material DB 11 to obtain the "Learning Material Entity" of the record that contains the "Learning Material Unit Number" of the current learning material unit. The learning server machine 10 creates Web data including the "Learning Material Entity" and transmits it to the client machine 20 (Sb2). This step Sb2 is a learning material transmitting step.

Just then, the client machine 20 receives the Web data transmitted at step Sb2 corresponding to the current learning material unit and displays it as the Web page as shown in FIG. 9 (Sa2). The learner studies with the "Learning Material Entity" in the Web page displayed at step Sa2 and clicks either the "Understood" button or the "Not Understood" button. More specifically, the learner clicks the "Understood" button in FIG. 9 when he or she understood the contents of the learning material unit. On the other hand, when the learner could not understand the contents of the learning material unit, he or she should click the "Not Understood" button.

The client machine 20 detects the event generated by the click of one of these buttons and transmits information representing the event (response information) to the learning servermachine 10 (Sa3). After that, the client machine 20 causes the process to branch according to the event detected at step Sa3 (Sa4). When the event is a click of the "Not understood" button, the client machine 20 executes the process of steps Sa5 to Sa7 to show the explanation with respect to the contents that was not understood by the learner. When the event is a click of the "Understood" button, the client machine 20 finishes the process.

The learning server machine 10 receives the response information transmitted at step Sa3 and creates a record including the event of the response information (button click history) to add the learning history DB 16 (Sb3). The step Sb3 is a response information receiving step.

The learning server machine 10 causes the process to branch according to the response information received at step Sb3 (Sb4). When the response information represents that the event is a click of the "Not understood" button, the learning server machine 10 executes the process of steps Sb5 to Sb7 to show the explanation with respect to the contents that was not understood by the learner. When the response information represents that the event is a click of the "Understood" button, the learning server machine 10 finishes the process.

The process executed when the "Not Understood" button was clicked (Sa5 to Sa7 and Sb5 to Sb7) will be described below.

The learning server machine 10 refers to the knowledge tree DB 12 to create a Web data showing the structure of the knowledge tree and refers to the choosing ratio DB 18 to add the vales of the "Choosing ratio" field in the Web data of the knowledge tree.

The names of the end-nodes of the knowledge tree are the headings of the explanations. The choosing ratio is a relevance information that gives indication to choose at least one of the explanations. The learning server machine 10 transmits an explanation choice information that is a Web data including the knowledge tree with the headings of the explanations and the relevance information to the client machine 20 (Sb5). This step Sb5 is an explanation choice transmitting step.

However, the learning server machine 10 may exclude the choosing ratio from the explanation choice information when the number stored in the "Number of Not Understood Learners" field is smaller than the predetermined number because of insufficient accumulation.

The client machine 20 receives the Web data of the knowledge tree (the explanation choice information) and displays the Web page as shown in FIG. 10 (Sa5). In the Web page of FIG. 10, the headings and the relevance information are shown as parts of the knowledge tree. That is, the choosing ratios are indicated adjacent to the end-nodes T1 to T9.

In view of the Web page, the learner realizes the frequency of the explanations referred by the other learners. For instance, the highest is the choosing ratio of the end-node T7 showing a transport layer (37%), the next is the choosing ratio of the end-node T5 showing a data link layer (11%) and the next is the choosing ratio of the end-node T8 showing IP address (10%).

In the embodiment, the relevance information contains the choosing ratio and color attribute for displaying the end-node as color information. For example, the end-node T7 with the highest choosing ratio is indicated as red rectangle and the end-node T5 with the next choosing ratio is indicated as yellow rectangle. Therefore, a learner can rapidly finds the end-node with the highest choosing ratio through intuition.

The end-node with the high choosing ratio may be indicated by a different color or different brightness from the other nodes. A blink indication or a reverse indication is also acceptable.

The learner operates the client machine 20 to choose the most relevant end-node to the content that could not be understood from the end-nodes T1 to T9. Since the end-node with the high choosing ratio corresponds to the content that could not be understood by the most learners, it can be assumed that the most learner will not able to understand the content in future. Therefore, if a learner is not sure which end-node is relevant to the content that could not be understood, there is a high possibility that he or she obtains key to understanding by choosing the end-node with high choosing ratio.

After the choice of the end-nodes, the client machine 20 detects the event caused by the choice and transmits information representing the detected event (choice information) to the learning server machine 10 (Sa6). When the learning server machine 10 receives the choice information transmitted at step Sa6, the learning server machine 10 recognizes the end-node chosen by the learner based on the choice information and identifies the explanation corresponding to the chosen end-node (Sb6). This step Sb6 is a choice information receiving step.

More specifically, the learning server machine 10 refers to the knowledge tree DB 12 to identify the record whose "Node Number of Next Hierarchy" field holds the number corresponding to the end-node chosen by the learner. Then the learning server machine 10 obtains the explanation number stored in the "Explanation Number" field of the identified record. Further, the learning server machine 10 extracts the record that has the obtained explanation number in the "Explanation Number" field from the explanation DB 13 and obtains the data in the "Explanation Entity" field of the extracted record.

The learning server machine 10 creates Web data including the data obtained from the "Explanation Entity" field and transmits the Web data to the client machine 20 (Sb7). In addition, the learning server machine 10 adds a new record to the detailed history DB 17. The number of the chosen end-node is stored in the "Chosen Node" field of the new record. After that, the learning server machine 10 finishes the process. The step Sb7 is an explanation transmitting step.

The client machine 20 receives the Web data transmitted at step Sb7 and displays it on a monitor as a Web page for the explanation (Sa7). After that, the client machine 20 finishes the process. For instance, the Web page for the explanation shown in FIG. 11 is displayed on the monitor of the client machine 20. The explanation supplements learner's knowledge about the contents that could not be understood through the learning material unit. Therefore, the learner can go on to the next learning material unit.

In the above embodiment, the Web page (FIG. 10) including the knowledge tree is displayed to choose the end-node. Instead of the knowledge tree, a Web page of FIG. 15 may be displayed. In the Web page of FIG. 15, three headings (end-nodes) are listed in order of decreasing choosing ratio. A learner can choose one of three choices to display the explanation corresponding to the heading.

Further, the learning server machine 10 analyzes the accumulated data on the predetermined cycle (a period of the course, for example) to calculate an evaluation value of a learning material that is useful for evaluation. The analyzed result is stored in a learning material evaluation DB 19 shown in FIG. 16. The learning material evaluation DB 19 includes a plurality of records created for the respective learning material numbers. Each record of the learning material evaluation DB 19 contains fields of "Learning Material Number", "Learning Material Evaluation Value" and "Total Number of Learners".

Further, each record of the learning material evaluation DB 19 contains a plurality of sets of the "Learning Material Unit Number" field, the "Weighting Value of Learning Material Unit" field, the "Number of Not Understood Learners" field, the "Number of Understood Learners" field and the "Evaluation Value of Learning Material Unit" field corresponding to a plurality of the learning material units. The learning material unit number of the corresponding learning material unit is stored in the "Learning Material Unit Number" field. Predetermined weighting value that is given to the learning material unit according to a level of importance is stored in the "Weighting Value of Learning Material Unit" field. The weighting value of the relatively important learning material unit becomes higher. The weighting value is normalized vale and the total of the weighting values of all the learning material units included in one learning material is equal to "1".

In the "Total Number of Learners" field, the "Number of Not Understood Learners" field, the "Number of Understood Learners" field and the "Evaluation Value of Learning Material Unit" field of the learning material evaluation DB 19, the corresponding values calculated through the analyzing process for evaluating the learning material are stored. The analyzing process for evaluating the learning material will be described with reference to the flowchart shown in FIG. 17. The process of the flowchart is executed for each learning material in an education course at the predetermined time (the finish time of the period of course, for example).

When the analyzing process for evaluating the learning material starts operating, the learning server machine 10 refers to the learning management DB 15 (FIG. 7) to count the records whose "Lecture Identifying Number" is coincident with the target learning material and stores the counted number to the "Total Number of Learners" field of the learning material evaluation DB 19 shown in FIG. 16 (S101). Then the learning server machine 10 executes the process (S102 to S105) in a loop L1 for the respective learning material units included in the target learning material.

In the loop L1, the learning server machine 10 extracts the records whose "Leaning Material Unit Number" matches the target learning material unit from the learning history DB 16 is shown in FIG. 8 (S102). Then the learning server machine 10 counts the records whose "Event" fields match the code representing the click of the "Not Understood" button in the records extracted at step S102 and stores the counted number in the "Number of Not Understood Learners" field corresponding to the target learning material unit (S103). Further, the learning server machine 10 counts the records whose "Event" fields match the code representing the click of the "Understood" button in the records extracted at step S102 and stores the counted number in the "Number of Understood Learners" field corresponding to the target learning material unit (S104).

After that, the learning server machine 10 calculates the learning material unit evaluation value U according to the following equation (1):

$$U=(P1*\alpha - P2*\beta)/M \ldots \qquad (1)$$

Where
M is the "Total Number of Learners",
P1 is the "Number of Not Understood Learners",
P2 is the "Number of Understood Learners",
$\alpha$ is a weighting value for the "Not Understood" button ($\alpha=4$), and
$\beta$ is a weighting value for the "Understood" button ($\beta=1$).

The learning material unit evaluation value U is stored in the "Evaluation Value of Learning Material Unit" field corresponding to the target learning material unit (S105). The learning server machine 10 repeats the process in the loop L1 for every learning material unit and then leaves from the loop.

After that, the learning server machine 10 calculates the weighted vales of the respective learning material units by multiplying the "Learning Material Unit Evaluation Value" (U) by the "Weighting Value of Learning Material Unit", and adds up the weighted values to obtain the learning material evaluation value. The learning server machine 10 stores the calculated vale in the "Learning Material Evaluation Value" field of the learning material evaluation DB 19 (S106) and finishes the flowchart of FIG. 17.

The smaller the evaluation value for the learning material (unit) becomes, the higher the quality of the corresponding learning material (unit) becomes and the easier the understanding by learners becomes. Accordingly, if the evaluation value is relatively large, a prepare of the learning material should judge that the learning material is difficult to be understood and revise the contents. Reactions of learners with respect to the learning material feeds back to a prepare, which improves the quality of the learning material.

Further, an icon representing "still-unsolved" may be indicated in the Web page of the knowledge tree of FIG. 10. In such a case, when the ratio of clicks of this icon is beyond the predetermined level, the learning server machine 10 may issue an alert to the person in charge.

With the learning support method and program, since a leaner can easily understand contents of a learning material, a learner can continue learning comfortably and effectively without stopping the learning.

What is claimed is:

1. A learning support method with an on-line computer that holds a plurality of learning materials, explanations to describe said contents in detail and relevance information that gives indication to choose at least one of said explanations, said method comprising:

transmitting one of said learning materials to a client machine;

receiving an intelligibility declaration of a learner about the transmitted learning material from said client machine;

transmitting to said client machine explanation choice information including headings of said explanations corresponding to the transmitted learning material and said relevance information when said intelligibility declaration of the learner represents that the learner did not understand said learning material;

receiving information representing which explanation the learner chose based on the transmitted headings; and transmitting the chosen explanation to said client machine, so that said client machine displays the chosen explanation, wherein said relevance information contains a choosing ratio of each of said explanations chosen by learners who used the same learning material.

2. The learning support method according to claim 1, wherein said relevance information contains said choosing ratio and a color attribute for displaying said explanation choice information as color information.

3. The learning support method according to claim 1, wherein said explanation choice information contains information to display a knowledge tree showing a structure of said learning material on said client machine and wherein said headings of the explanations and said relevance information are shown as parts of said knowledge tree.

4. The learning support method according to claim 1, further comprising:

a storing data transmitted from client machines at representing which explanation the learner chose for each learning material; and calculating said choosing ratios of said respective explanations that are chosen by learners with respect to the predetermined learning material based on the stored data, wherein said calculated choosing ratios are used as said relevance information.

5. A computer-readable medium storing a learning support program for controlling an on-line server machine that holds a plurality of learning materials, explanations to describe said contents in detail and relevance information that gives indication to choose at least one of said explanations to execute processes, the controlling comprising:

transmitting one of said learning materials to a client machine;

receiving an intelligibility declaration of a learner about said learning material from said client machine;

transmitting to said client machine explanation choice information including headings of said explanations corresponding to the transmitted learning material and said relevance information when said intelligibility declarations of the learner represents that the learner did not understand said learning material;

receiving information representing which explanation the learner chose based on the transmitted headings; and transmitting the chose explanation to said client machine, so that said client machine displays the chose explanation, wherein said relevance information contains a choosing ratio of each of said explanations chosen by learners who used the same learning material.

6. A learning support server machine comprising:

a learning material storage that stores a plurality of learning materials;

an explanation storage that stores explanations to describe said contents in detail;

a relevance information storage that stores relevance information that gives an indication to choose at least one of said explanations;

a transmitter that transmits information to client machine;

a receiver that receives information from said client machine;

a controller that controls said transmitter to transmit said learning material to said client machine, to transmit to said client machine explanation choice information including headings of said explanations corresponding to the transmitted learning material and said relevance information when said receiver receives an intelligibility declaration representing that the learner did not understand said learning material, and to transmit the explanation corresponding to the chosen heading to said client machine, so that said client machine displays the chosen explanation when said receiver receives choice information representing which explanation the learner chose based on the transmitted headings, wherein said relevance information contains a choosing ratio of each of said explanations chosen by learners who used the same learning material.

7. The learning support server machine according to claim 6, wherein said relevance information contains said choosing ratio and a color attribute for displaying said explanation choice information as color information.

8. The learning support server machine according to claim 6, wherein said explanation choice information contains information to display a knowledge tree showing a structure of said learning material on said client machine and wherein said headings of the explanations and said relevance information are shown as parts of said knowledge tree.

9. The learning support server machine according to claim 6, further comprising:

a choice information storage that stores said choice information transmitted from client machines for each learning material; and a calculator that calculates said choosing ratios of said respective explanations that are chosen by learners with respect to the predetermined learning material based on said choice information, wherein said choosing ratios calculated by said calculator are used as said relevance information.

* * * * *

UNITED STATES PATENT AND TRADEMARK OFFICE
CERTIFICATE OF CORRECTION

PATENT NO.         : 7,171,155 B2
APPLICATION NO. : 10/259882
DATED              : January 30, 2007
INVENTOR(S)        : Shunichi Kamikawa et al.

It is certified that error appears in the above-identified patent and that said Letters Patent is hereby corrected as shown below:

Column 11, Line 25, before "storing" delete "a".

Column 11, Line 25, after "machines" delete "at".

Column 11, Line 48, change "declarations" to --declaration--.

Column 11, Line 52, change "chose" to --chosen--.

Column 11, Line 53, change "chose" to --chosen--.

Signed and Sealed this

Twenty-ninth Day of May, 2007

JON W. DUDAS
*Director of the United States Patent and Trademark Office*